United States Patent
Pedrero Iniguez et al.

(10) Patent No.: US 8,296,018 B2
(45) Date of Patent: Oct. 23, 2012

(54) HEADREST SYSTEM, SEAT WITH A HEADREST SYSTEM, AND VEHICLE INCLUDING SAME

(75) Inventors: Juan Manuel Pedrero Iniguez, Zamudio (ES); Mercedes Ferros Presa, Zamudio (ES); Jesus Murgoitio Larrauri, Zamudio (ES); Inaki Iglesias Aguinaga, Zamudio (ES); Antonio Sanchez Diaz, Zamudio (ES)

(73) Assignee: Fundacion Robotiker (ES)

( * ) Notice: Subject to any disclaimer, the term of this patent is extended or adjusted under 35 U.S.C. 154(b) by 425 days.

(21) Appl. No.: 12/530,457

(22) PCT Filed: Mar. 8, 2007

(86) PCT No.: PCT/ES2007/000124
§ 371 (c)(1),
(2), (4) Date: Apr. 6, 2010

(87) PCT Pub. No.: WO2008/107494
PCT Pub. Date: Sep. 12, 2008

(65) Prior Publication Data
US 2010/0213748 A1  Aug. 26, 2010

(51) Int. Cl.
*B60R 21/055* (2006.01)
*B60N 2/42* (2006.01)
*B60N 2/48* (2006.01)

(52) U.S. Cl. ....... 701/49; 701/45; 297/410; 297/216.12; 280/753; 180/271

(58) Field of Classification Search .................. 297/410, 297/216.1, 216.12, 217.3; 296/68.1; 280/735, 280/751, 753; 701/45, 49; 180/271
See application file for complete search history.

(56) References Cited

U.S. PATENT DOCUMENTS

| 4,645,233 | A |   | 2/1987 | Bruse |
| 5,848,661 | A |   | 12/1998 | Fu |
| 6,042,145 | A |   | 3/2000 | Mitschelen |
| 6,088,640 | A |   | 7/2000 | Breed |
| 6,402,195 | B1 |   | 6/2002 | Eisenmann |
| 7,703,847 | B2 | * | 4/2010 | Szablewski ............. 297/216.14 |
| 7,794,012 | B2 | * | 9/2010 | Szablewski ............. 297/216.12 |
| 7,967,377 | B2 | * | 6/2011 | Truckenbrodt et al. .... 297/217.3 |

(Continued)

FOREIGN PATENT DOCUMENTS

DE    3240294 A1    5/1984

(Continued)

OTHER PUBLICATIONS

International Preliminary Report on Patentability (IPRP) for PCT/ES2007/000124.

(Continued)

*Primary Examiner* — Ruth Ilan
(74) *Attorney, Agent, or Firm* — Fulwider Patton LLP (57) ABSTRACT

The invention relates to a headrest system comprising:
 a headrest device (1);
 a plurality of sensors (2, 3); and
  an electromechanical headrest device positioning system, associated to said sensors (2, 3). Data are recorded during an upward movement of the headrest device (1), relating to the distance between the headrest device (1) and the head in a plurality of positions of the headrest device (1) throughout said upward movement. The upward movement ends when, through the sensors, the system detects that the headrest is at a certain height. Based on this data recorded during the upward movement, the headrest device (1) is moved substantially horizontally until it is located at a certain distance from the head.

22 Claims, 5 Drawing Sheets

U.S. PATENT DOCUMENTS

2007/0027599 A1* 2/2007 Sakai et al. ............ 701/49
2009/0265063 A1* 10/2009 Kasugai et al. ............ 701/49

FOREIGN PATENT DOCUMENTS

| | | |
|---|---|---|
| DE | 19731053 A1 | 1/1999 |
| DE | 10062511 A1 | 6/2002 |
| EP | 1270316 A2 | 1/2003 |
| EP | 1375246 A1 | 1/2004 |
| FR | 2810931 A1 | 1/2002 |
| FR | 2866846 A1 | 9/2005 |
| GB | 2301906 A | 12/1996 |
| GB | 2320426 A | 6/1998 |
| GB | 2383530 A | 7/2003 |
| JP | 3221005 A | 9/1991 |
| JP | 8187139 A | 7/1996 |
| JP | 11169258 A | 6/1999 |
| WO | WO 2006094784 A1 | 9/2006 |

OTHER PUBLICATIONS

International Search Report (ISR) for PCT/ES2007/000124.

* cited by examiner

HEADREST SYSTEM, SEAT WITH A HEADREST SYSTEM, AND VEHICLE INCLUDING SAME

CROSS-REFERENCE TO RELATED APPLICATIONS

This Application is the U.S. National Stage of International Application No. PCT/ES2007/000124, filed Mar. 8, 2007.

TECHNICAL FIELD OF THE INVENTION

The invention is comprised in the field of adjustable headrests for automotive vehicles.

BACKGROUND

To prevent serious injuries, especially at the cervical level (caused by what is known as "whiplash" and which can cause an entire series of injuries in the neck, vertebrae and spinal cord), in the event of an automobile accident, it is important that the occupants of the vehicle have the headrests placed in a correct position when the accident occurs. To that end, headrests conventionally have means allowing their adjustment, both in height and in closeness to the head of the user. However, in many cases, the position of the headrest is adjusted manually, therefore it depends on the intervention of the user. This implies that if the user does not correctly position the headrest, it is probable that he or she drives having it in a position which can involve serious injuries in the event of an accident. These problems are accentuated when the same vehicle is driven by people with different heights.

Therefore, it would be desirable for the headrest to be automatically positioned when the user occupies the corresponding seat. It could even be of interest for this positioning to be carried out continuously, being adapted to the changes of position of the user.

Some parameters which may be relevant for suitably placing a headrest in a vehicle are the following:
- the vertical position of the headrest; it is usually considered that the upper edge of the headrest must be aligned (vertically) with the upper edge of the head of the user.
- the distance between the headrest and the head of the user; this distance must be the suitable one to prevent an impact in the neck area.

These distances (both in a vertical direction in a horizontal direction) must be within a range suitable for reducing the relative movement between the head and the trunk of the occupants and preventing the serious injuries mentioned above. A well-located headrest must first limit the longitudinal movement of the head and then its backward rotation.

In other words, the headrest must not be located excessively far from the head of the user. In some countries such as in the United States, according to regulations, the headrest must be in contact with the head of the user. For that reason it is important for the distance between the headrest and the head of the user (i.e., basically, the position in a horizontal direction of the headrest) to be adjustable or configurable according to the regulations in force, with the preferences of the user and/or with other criteria.

There are several publications which relate to devices for the adjustment in a vertical direction (i.e., in height) of the headrest:

GB-A-2320426 describes a system using sensors which can determine the position of the inner rear-view mirror and the position of an outer rear-view minor, to thus calculate the position of the eyes of the driver and, based on such position, to determine the vertical position of the headrest. This system represents certain drawbacks. For example, it requires sensors outside the headrest associated to the rear-view minors, whereby the system acquires a certain complexity in its implementation in the vehicle. The calculation is carried out approximately since the position of the minors is not directly related with the exact position of the eyes. Furthermore, the position of the eyes does not allow exactly determining the position of the upper end of the head and, therefore, the exact position which the headrest must occupy. Furthermore, this system only serves to adjust the headrest of the driver.

GB-A-2383530 describes a system making a calculation of the position of the head from a sensor arranged in the headliner of the vehicle or in the headrest. Based on this calculation it places the headrest in a certain vertical position. However, this system is not very accurate in the detection of the position of the head and, therefore, in the detection of the position of the upper end of the head.

FR-A-2810931 describes a device comprising a light emitter arranged, for example, in the rear-view minor, and a receiver housed inside the headrest to receive the beam of light from the emitter. This system is not very accurate since the detection of the upper edge of the head depends on the relative position between the position of the head and the light emitter, which can give rise to errors. Furthermore, the beam of light can be annoying since it can impinge on the eyes of the user. The system furthermore requires elements which are arranged outside the headrest, complicating the implementation of the system in a vehicle.

U.S. Pat. No. 6,402,195 describes a headrest incorporating two condensers, arranged at different heights such that the head of the user opposite the condensers acts as a dielectric producing an output signal in the condensers. By comparing the signals of the two condensers, the device can determine the optimal position of the headrest in a vertical position. However, this form of detection with condensers perhaps cannot determine the position of the upper edge of the head very accurately, but rather it will make estimate the vertical position of the head according to the closeness thereof to the headrest.

DE-A-10062511 describes a method for positioning a headrest based on the measurement of the distance of the rear part of the head to the headrest, comparing measured values with theoretical values by means of a calculation algorithm. This method is therefore based on a theoretical estimation of the position of the head.

U.S. Pat. No. 6,042,145 describes a headrest comprising an infrared sensor scanning the head of the user and calculating the vertical position of the headrest. This device is not very accurate either since it is based on calculating the position of the point closest to the headrest and, based on such position, calculating the position of the highest point of the head. In other words, the position of the highest point of the head is not measured but rather this position is determined indirectly and approximately. The closeness of the headrest is adjusted by moving the entire seat closer or further away. U.S. Pat. No. 5,848,661 describes a headrest and a back of a seat comprising multiple pressure sensors through which the system can determine (estimate) the position of the head and thus vertically adjust the headrest. The method does not seem very accurate and furthermore requires the head to be supported against the headrest.

JP-A-8-187139 describes a similar device using a single pressure sensor arranged in the headrest.

U.S. Pat. No. 4,645,233 describes several embodiments of a device for adjusting the height of the headrest. In one embodiment a light emitter arranged in the front part of the vehicle roof and a receiver arranged in the headrest are used. In another embodiment a sensor arranged in the roof just above the head of the user is used. In another embodiment there is a sensor arranged in the front part of the roof and which responds to the reflection of light from the eyes of the user. The possible use of a pyroelectric sensor detecting the heat emitted by the head of the user is also described. An embodiment is also described in which a light emitter-receiver is incorporated in the upper part of the headrest to detect the position of the upper end of the head.

All the documents mentioned above relate to systems which lack an adjustment of the headrest in the sense of closeness/separation with respect to the head, i.e., to systems which do not comprise an adjustment of the distance between the head of the user and the headrest, i.e., an adjustment in a horizontal direction of the headrest.

U.S. Pat. No. 6,088,640 describes a system which allows adjusting the position of the headrest in height (vertical adjustment) and in closeness. For the vertical adjustment, the headrest incorporates a sensor made up of an emitter and a receptor which can detect the position of the head with respect to the headrest (horizontal distance or closeness). By moving the headrest up and down, the system determines the position of the point at which the head is closest to the headrest. Based on this piece of data, the system calculates the position of the highest point of the head. To that end, it uses a series of theoretical patterns with which it compares the values obtained by the sensor. The patterns include situations in which the user can wear a hat, a scarf, long hair, etc. It carries out adjustment in closeness by contact, moving the headrest forwards until it meets a hard object (which is taken to be the head), using to that end a contact sensor. This system has the drawback that the adjustment in height is carried out based on an estimative method and the adjustment in closeness is carried out until the device contacts the head of the user, which may be valid for the United States regulations but may be uncomfortable (especially in view of the fact that many users do not want to have the headrest in continuous contact with the head) and, therefore, not very attractive for users in countries which do not require the head to be in continuous contact with the headrest.

There are also devices adjusting the position of the headrest based on different means. In this sense, JP-A-3-221005 describes how the headrest is moved by acting on switches, i.e., by the intervention of the user. EP-A-1270316 describes a system in which the headrest moves forwards automatically activated by the signal of an acceleration sensor which warns of an imminent impact. Devices of this type are common but have the drawback that they depend on a collision sensor and on the reaction capacity of the motors and mechanisms. It may be preferable to always have the headrest in the suitable position.

DESCRIPTION OF THE INVENTION

A first aspect of the invention relates to a headrest system comprising:
a headrest device configured to serve as a support for the rear part of the head of a user (this device can have a conventional configuration);
a plurality of sensors located in the headrest device and configured to record data relating to said head; and
an electromechanical headrest positioning system, associated to said sensors and configured to locate the headrest device in a certain position, in a vertical and horizontal direction, according to information coming from said sensors.

In this context, the term "sensor" should be interpreted broadly, not only as an actual sensor module, but also as including hardware and/or software necessary for capturing signals, optionally generating signals, and converting signals into information that can be interpreted by an electronic data processing system. The "plurality" of sensors can comprise independent sensors but can also comprise sensors sharing hardware and/or software, for example, two infrared sensors can share the hardware and software emitting infrared radiation and capturing reflected infrared radiation, but each sensor can comprise additional hardware and/or software for converting the captured signal into different types of useful information for the electronic system.

According to the invention, the headrest positioning system is configured to, as a response to an activation or start signal, carry out the following operations:
starting an upward movement of the headrest device until detecting, by means of at least one of said sensors, that the headrest device has reached a certain height with respect to an upper edge of the head;
stopping said upward movement of the headrest device when the system detects that the headrest device is located at said certain height;
recording, during said upward movement and by means of at least one of said sensors, data relating to the distance between the headrest device and the head in a plurality of positions of the headrest device throughout said upward movement (i.e., the head is "scanned");
once said upward movement has stopped, moving substantially horizontally the headrest device, according to said data, to locate the headrest device at a certain distance from the head.

Thus, the headrest device carries out a single upward movement until reaching a certain position (for example, until reaching the height of the edge of the head of the user), using this travel to scan the rear part of the head of the user and, once the upward movement stops, the headrest is moved closer to or away from the head, until the headrest device is located at a pre(determined) distance from the head (this can optionally be combined with a certain downward movement of the headrest device, if it is not to be located in the highest position; the "horizontal" position is calculated from the data recorded during the scanning which is carried out during the upward movement, such that the headrest device can be located at a predetermined distance from the "closest" point of the head recorded during said scanning.

Furthermore, the scanning serves to obtain a head "profile" which can be compared with head profile patterns, which can serve to prevent operation errors when the user wears a hat, tied hair, etc. The "jump" in "distance to the head" detected by the sensor in the event of a hat or tied hair can make the system generate an alarm or enter an operation mode especially programmed for these cases.

The described system is advantageous because strange, annoying and repetitive movements are prevented; the entire process can be carried out by means of a movement for moving the headrest closer to/away from the head.

The plurality of sensors can comprise at least one sensor configured to detect the upper edge of the head. This sensor can be located at an upper end of the headrest device, although it can also be located in other areas of the headrest device. The sensor can be configured to generate a first output signal when it records a presence of an object in front of the sensor, and to generate a second output signal when it does not detect such presence of an object. The sensor and the positioning system can be configured to stop the upward movement when the upper edge of the headrest is substantially located at the height of the upper edge of the head.

The plurality of sensors can comprise at least one sensor configured to generate an output signal indicating a distance between the headrest device and a point of the head located in front of said sensor.

Any of the described sensors, or both of them, can be infrared sensors, based on the emission of an infrared radiation signal and on the capture of the reflected (by the head of the user) part of the signal, such that the ratio between the emitted and captured signal (for example, the inclination or angle between both) indicates the distance between the sensor and an object located in front of the sensor (namely, in this case, the head of the user).

The sensor configured to generate an output signal indicating a distance between the headrest device and a point of the head located in front of the sensor can be located in a central area of the headrest device.

The upward movement can be a linear movement along a first shaft, for example, generated by a first motor forming part of the positioning system and which, for example, interacts with at least one threaded rod parallel to said first shaft. A rotational movement of the motor can thus cause the linear movement of the headrest device along said first shaft.

The substantially horizontal movement can be a movement according to a second shaft, for example, a rotational movement about said second shaft, said second shaft being perpendicular to said first shaft. However, in some embodiments of the invention, this substantially horizontal movement can also be a linear movement, for example, perpendicular to said first shaft.

The positioning system can comprise a second motor configured to cause said substantially horizontal movement.

Furthermore, in some embodiments of the invention, the system can comprise at least one contact sensor located in the headrest device and configured to detect the contact with the head of the user with the headrest device, the positioning system being configured to change the position of headrest device when said at least one contact sensor detects a contact force greater than a predetermined threshold. The user can thus voluntarily move the headrest device, for example, by pressing it backwards with his or her head.

The system can comprise an electronic subsystem configured to control the position of the headrest device by means of said upward movement and said substantially horizontal movement, according to signals received from the sensors.

The positioning system can be configured to adjust the position of the headrest device (in a vertical and/or horizontal direction) according to a readjustment frequency.

Another aspect of the invention relates to a vehicle seat comprising a seat part and a back part (which can be conventional) and incorporating, in the back part, a headrest system according to what has been described above.

Another aspect of the invention relates to a vehicle including at least one of these seats.

BRIEF DESCRIPTION OF THE DRAWINGS

To complement the description being made and for the purpose of aiding to better understand the features of the invention according to preferred practical embodiments thereof, a set of drawings is attached as an integral part of the description in which the following has been depicted with an illustrative and non-limiting character.

PREFERRED EMBODIMENT OF THE INVENTION

Figure 1:
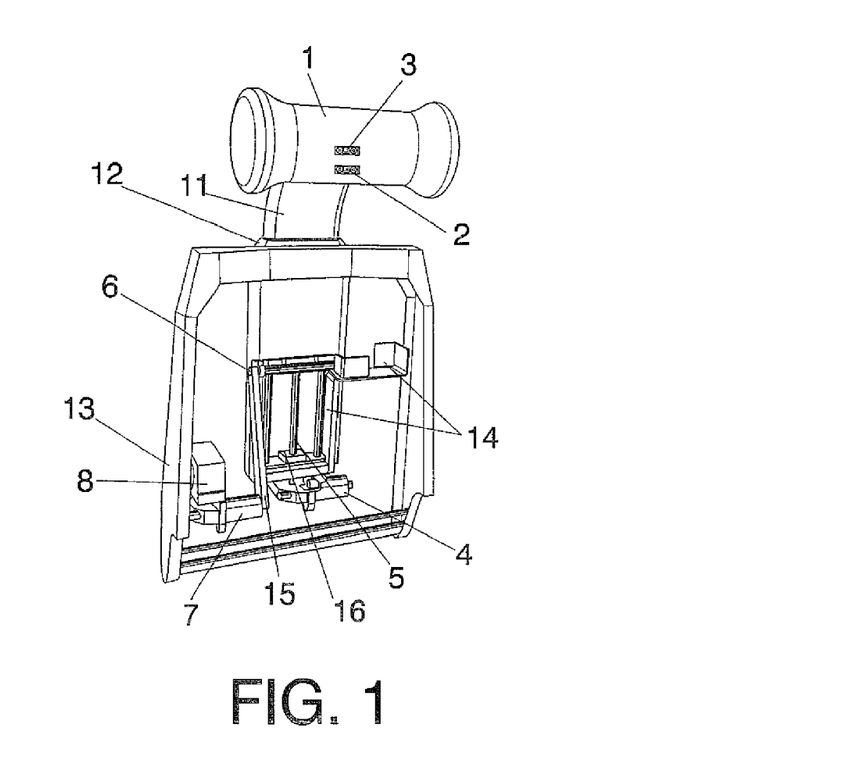
FIGS. 1 and 2 show two perspective schematic views of the headrest system according to according to a possible embodiment of the invention, with some elements eliminated to facilitate the view of other elements FIGS. 3A-3C schematically show three side views of the position of the headrest device with respect to a framework or frame, in three successive phases of the positioning process.
Figure 2:
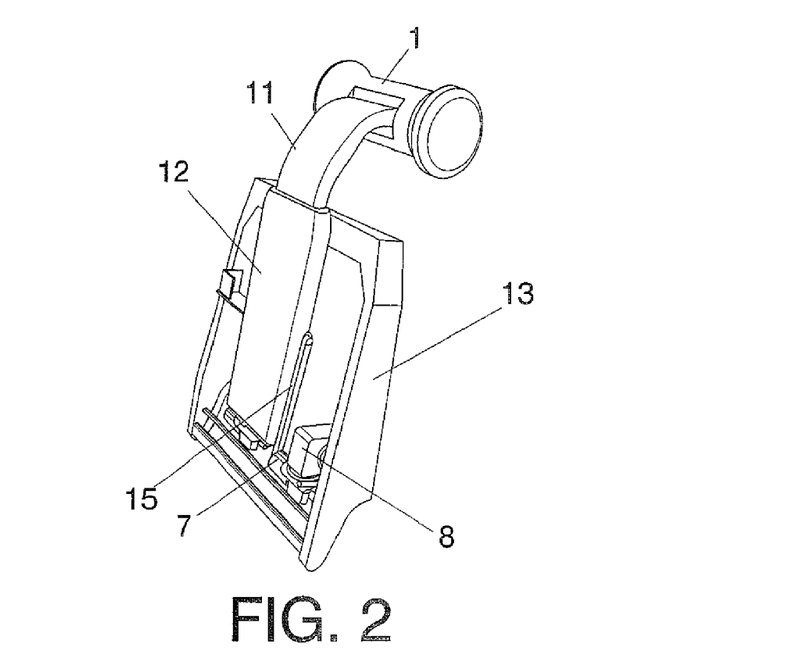

FIGS. 1 and 2 schematically reflect the headrest system according to according to a possible embodiment of the invention, in which the headrest device 1 can be seen assembled in an arm 11 which can move linearly within a casing 12, assembled in a framework or frame 13 configured to be assembled in the back of a seat of a vehicle, for example, an automotive vehicle such as a car. The arm 11 and the casing 12 and the frame 13 can be made of metal or of any another material (for example, a plastic material) which is sufficiently resistant.

The casing 12 is joined to the frame 13 by means of a support structure 14, which can likewise be made of metal or of another suitable material, such that the casing can pivot about a spindle or shaft 6 joined to said support structure 14.

The headrest device 1 can be of a conventional type and comprise a frame, coated with a shock absorbing material and with an outer covering made of leather or of another suitable material, such that it is a suitable surface for absorbing an impact of a head against the headrest device.

On the other hand, the headrest system comprising two sensors 2 and 3 located in the headrest device 1. Both sensors can be infrared sensors configured to measure the distance between the sensor and an object located in front of the sensor by means of, for example, the emission and reception of infrared radiation (for example, the sensors can be of those comprising an emitter-receiver of an infrared signal which is emitted and which, upon being reflected in an object, is collected by the same sensor (in its function as a receiver) with an inclination (angle) depending on the distance between the sensor and the object. The sensors comprise evaluation circuits (located in the headrest device 1 and/or in a electronic control subsystem 8 which can be located in any suitable place, for example, as shown in FIGS. 1 and 2 or, for example, under the seat, integrated with the rest of the controls allowing the movement of the seat, in the event that the seat has this possibility) which allow generating an output signal depending on the ratio between the radiation emitted and the radiation received, such that the output signal indicates (at least approximately) the distance between the headrest device and the object located in front of the device. There are many sensors of this type on the market, and the average person skilled in the art could easily choose the model which is best adjusted to each specific application, according to aspects such as price, size, etc.

On the other hand, the system comprises a motor 7 which, upon rotating, acts on the shaft 6 such that it causes a rotation of the casing 12, and with it, the arm 11 and the headrest device 1, according to this shaft 6, to which the casing 12 is joined.

Another motor 4, by means of a system of threaded rod 5 and nut 16, causes a relative movement between the rod and the nut. The rod 5 is connected to the arm 11, such that this relative movement causes an upward or downward movement of the arm 11 and, with it, of the headrest device 1.

The operation of the motors is controlled from the electronic control subsystem 8 which, according to the signals received from the sensors 2 and 3 and according to a program, causes an upward or downward movement of the arm 11, and/or a swinging movement of the casing 12 about the shaft 6.

Thus, the electronic subsystem is configured to, as a response to an activation signal (which can be associated to an activation of the electronic system of the car by a key, by a detection of a person in the seat, etc.), carry out a series of operations which will be explained below. However, before carrying out these operations, it may be suitable for the system to be in the rest position, i.e., in its lowest and most rested position. In this sense, the system could, for example, operates in two ways:

1) When the key is removed from the ignition of the vehicle, the system would pass to the rest position, whereby the headrest would be prepared for the operation described below.

2) According to another option, at the time of putting the key into the ignition, the headrest passes to the rest position and subsequently carries out the remaining operations.

From this rest position, as a response to the start or activation signal, the following operations could be carried out:

Starting (by acting on the motor 4 acting on the system of nut 16/rod 5) an upward movement of the headrest device 1 until detecting, by means of one of the sensors 3, that the headrest device 1 has reached a certain height with respect to an upper edge of the head. The sensor 3 in question could be a presence sensor and can be configured such that the electronic subsystem interprets that there is a presence of an object in front of the sensor or that there is no such presence, according to a signal delivered by the sensor (and which can have, for example, two levels, for example, a level of 0 volts meaning that there is no object in front of the sensor, and a level of 5 volts meaning that there is an object located in front of the sensor). The function of the sensor 3 can thus be that of providing to the electronic subsystem a signal which allows determining if there is or not an object in front of the sensor. The sensor 3 thus serves to detect the position of the headrest device with respect to the upper part of the head of the user, which allows locating the headrest device flush with the upper part of the head.

Stopping said upward movement of the headrest device 1 when the electronic subsystem detects that the headrest device is located at said certain height (at which time the sensor 3 indicates that there is no object located in front of the sensor).

Recording, during said upward movement and by means of the other sensor 2, data relating to the distance between the headrest device 1 and the head in a plurality of positions of the headrest device 1 throughout said upward movement. In other words, the head is scanned and the corresponding data is stored.

Once said upward movement has stopped, the electronic subsystem 8 analyses the results of the scanning and pivots, by means of the motor 7 and the belt 15 communicating the motor with the shaft 6, the casing 12 with the arm 11 about the shaft 6, such that a (swinging but substantially horizontal) movement of the headrest device 1 occurs, until the headrest device is at a certain distance from the head (according to the data obtained during the scanning).

The advantages explained above are thus obtained. Repetitive, strange and annoying movements are prevented and the entire process can be carried out by means of a single upward movement followed by a movement for moving the headrest closer to/away from the head.

The sensor 2 determining the substantially horizontal movement is basically configured to generate an output signal indicating a distance between the headrest device 1 and a point of the head located in front of the sensor. This sensor 2 can be located in a central area of the headrest device. When the scanning occurs during the upward movement of the headrest device, a profile of the rear part of the head of the user is stored, which profile later determines the substantially horizontal movement, for example, with respect to the "closest point" of the head with respect to the headrest device. Furthermore, using a software based on head patterns, it is possible to detect anomalies such as hats, etc., and to take them into account so that the horizontal movement locates the headrest device 1 at the suitable distance from the head, to correctly fulfill its protective function.

As is inferred from FIGS. 1 and 2, in this embodiment of the invention the upward movement is a linear movement along a first shaft parallel to the threaded bar or rod 5, and the substantially horizontal movement is a rotational or swinging movement about a second shaft 6 perpendicular to said first shaft.

Figure 3A:
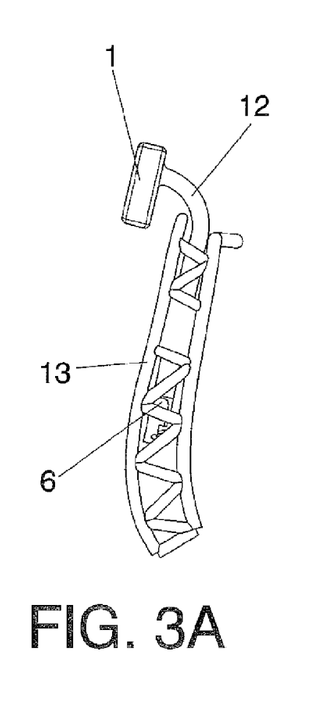
Figure 3B:
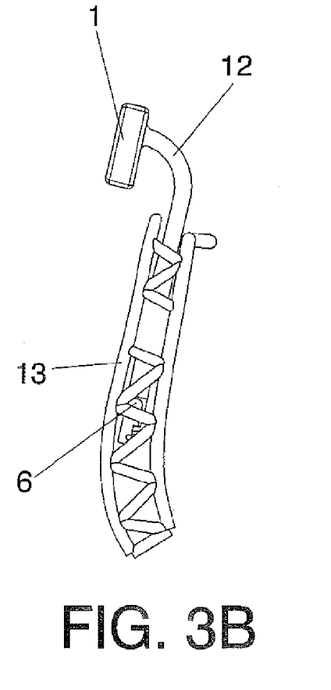
Figure 3C:
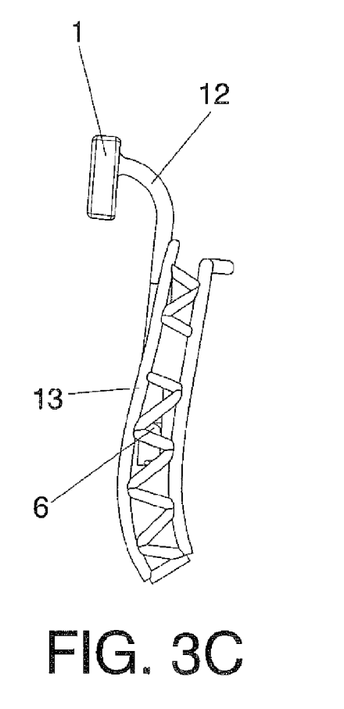

FIGS. 3A-3C schematically shows this process.

FIG. 3A shows the system in its rest position, with the headrest device in a position close to an upper part of the back of a seat (not shown) of a vehicle. The frame or framework 13 is conventionally housed in the seat.

Once the user has sat in the seat and/or activated the electrical system of the vehicle with the corresponding key and/or carried out another maneuver (the event causing the start of the positioning of the headrest system can be chosen according to the wishes of the user and/or of the manufacturer), the upward movement of the headrest device 1 and the arm 12 occurs, caused by the motor 4 (see FIG. 1). When the infrared sensor 3 (and the associated hardware and software forming part of the positioning system) detects the upper edge of the head (for example, by the "absence" of an object in front of the sensor 3), the upward movement stops and the headrest device is in the position of FIG. 3B. The substantially horizontal movement is then started by means of a pivoting about the shaft 6 driven by the motor 7 (shown in FIG. 1).

Figure 4:
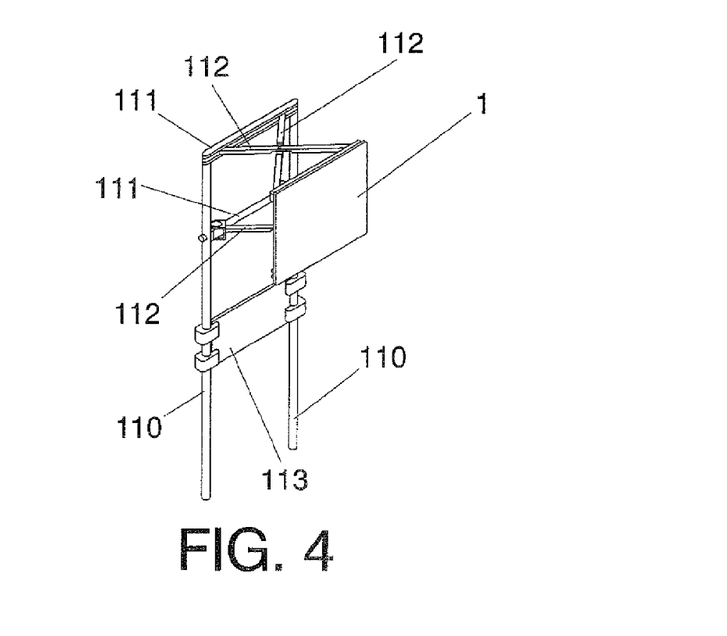
FIG. 4 shows some elements of an alternative embodiment with linear horizontal movement.

In another possible embodiment of the invention, the substantially horizontal movement can be a linear movement. FIG. 4 shows this mode, in which the headrest device 1 can be joined to two guided rods 110 in a part 113 of the frame, for its (substantially vertical) upward and downward movement. The rods 110 are joined by means of two horizontal rails 111, along which one of the ends of each bar 112 of two pairs of bars moves in a horizontal direction. The bars of each pair are articulated to one another, and the ends opposite to those which are joined to the rails 111 are joined to the headrest device, such that they can slide along the headrest device in a horizontal direction. Thus, with a motor acting on the bars 112 or directly on the headrest device, the headrest device can move away from the vertical rods 110 in a substantially horizontal linear movement.

Furthermore, and although it has not been shown in the figures, a contact sensor located in the headrest device 1 (for example, in a central area, for example, close to the sensors 2 and 3) has been provided in an embodiment of the invention, which sensor is configured to detect the contact with the head of the user with the headrest device (basically, it could be a pressure sensor). In this case, the positioning system can be configured to change the position of the headrest device when the contact sensor detects a contact force greater than a predetermined threshold. Thus, the user can, for example, cause an automatic withdrawal of the headrest device by pushing it backwards with his or her head.

The positioning system can be configured to adjust the position of the headrest device according to a readjustment frequency, for example, to check with a certain frequency that it is still aligned with the upper part of the head (which can be checked by carrying out an upward and/or downward movement and recording the data of the sensor 3) and scanning the rear part of the head with the sensor 2.

Also or alternatively, the system can check with a certain frequency the distance measured by the sensor 2 with respect to the rear part of the head and compare it with the predetermined distance at which it should be located, carrying out the corresponding adjustment when necessary.

It can thus be achieved that the headrest device maintains its suitable position with respect to the head of the user, in a horizontal and/or vertical direction.

Figure 5:
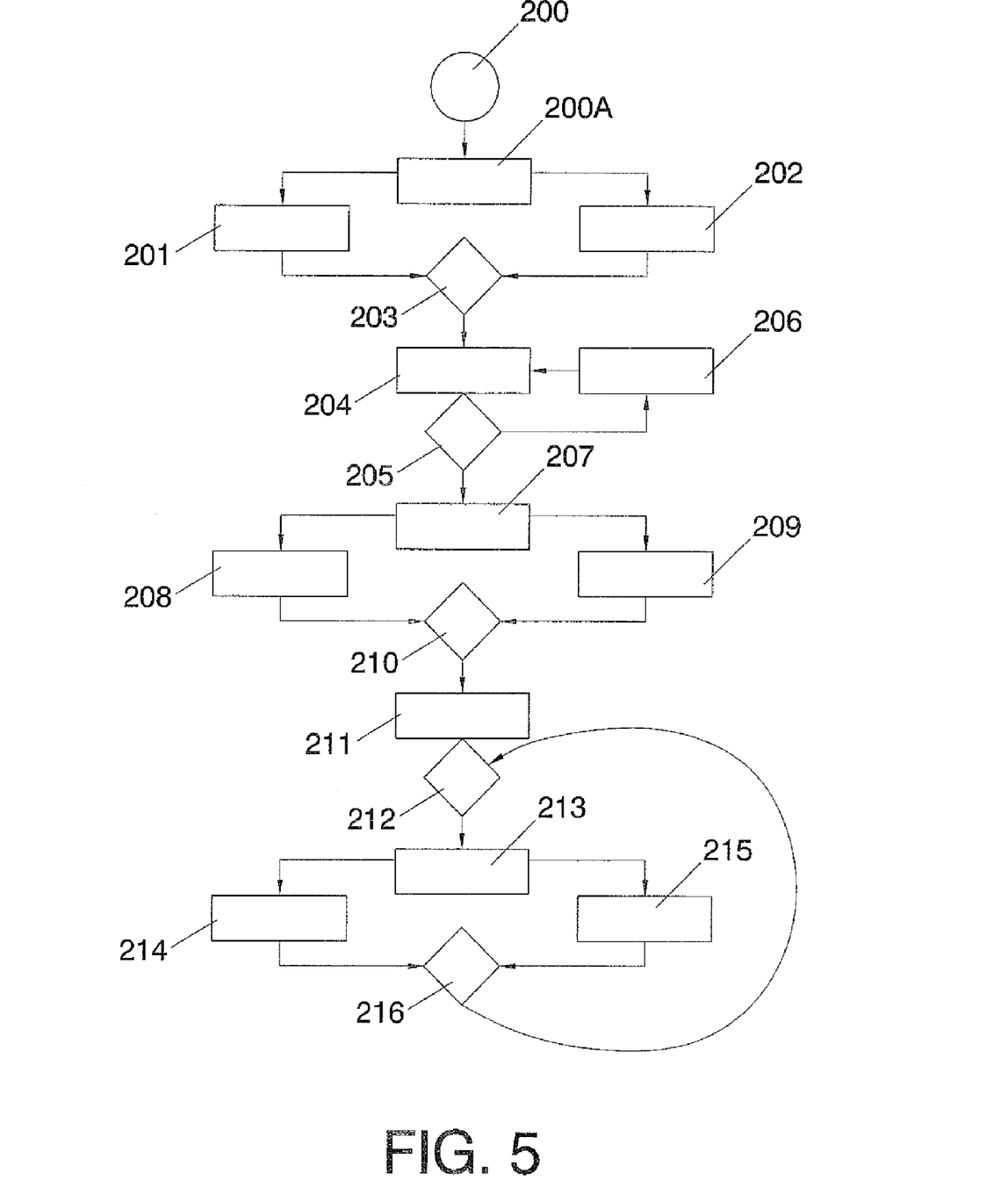
FIG. 5 schematically shows a flowchart of a possible form of operating the system shown in FIGS. 1 and 2.

FIG. 5 schematically shows an algorithm for operating a system such as that which has been shown in FIG. 1 and which can be implemented by means of a suitable software in the electronic control subsystem 8.

The steps are the following:

Reception (200) of a start signal (which can come, for example, from turning on the electronic system of the vehicle or its engine and/or from detecting the presence of somebody in the seat).

As s first action, the system makes sure (200A) that it is in its rest position, whereby the first motor 4 is activated (201) to move the headrest device 1 downwards, and the second motor 7 is activated (202) to move the device backwards, until it is detected (203) that the system is in its rest position (with the headrest device in its lowest and most withdrawn position with respect to the seat).

Once it has been checked that the system is in its rest position, a vertical movement (204) is started and during this movement it is checked continuously (205), with the electronic subsystem 8 and from the data, signals or information provided by the sensor 3, if the final position with respect to the upper part of the head of the user has been reached (which is considered not to have occurred while the sensor 3 gives a signal indicating the presence of the head). During this upward movement phase, the electronic control subsystem continuously records (206) data coming from the other sensor 2, i.e., data indicating the distance between the headrest device 1 and the head of the user.

Once the upper part of the head is detected (by means of the sensor 3), the electronic subsystem calculates (207) a head profile from the data obtained with the sensor 2 and a suitable position of the headrest device from a series of parameters and pre-programmed rules.

Then, by acting on the second motor 7 (and optionally on the first motor 4, to correct the downward movement effect caused by the swinging movement caused by the second motor 7), the headrest device is moved horizontally (209) and/or vertically (208) until reaching said suitable position (210).

To maintain the headrest in a suitable position with respect to the head of the user, it may be practical to control with a certain frequency that the position in height and in a horizontal direction is still correct with respect to the head. To that end, once the headrest device reaches its suitable position (210), a timer (211) can be activated such that, once a certain time (212) has elapsed, the position with respect to the head is checked again (for example, by means of reading signals of the sensor 2 and/or 3) and, according to the result, the first motor 4 (214) and/or the second motor 7 (215) can be activated until the headrest device returns to its suitable position (216). This process can be repeated from time to time (212).

Figure 6:
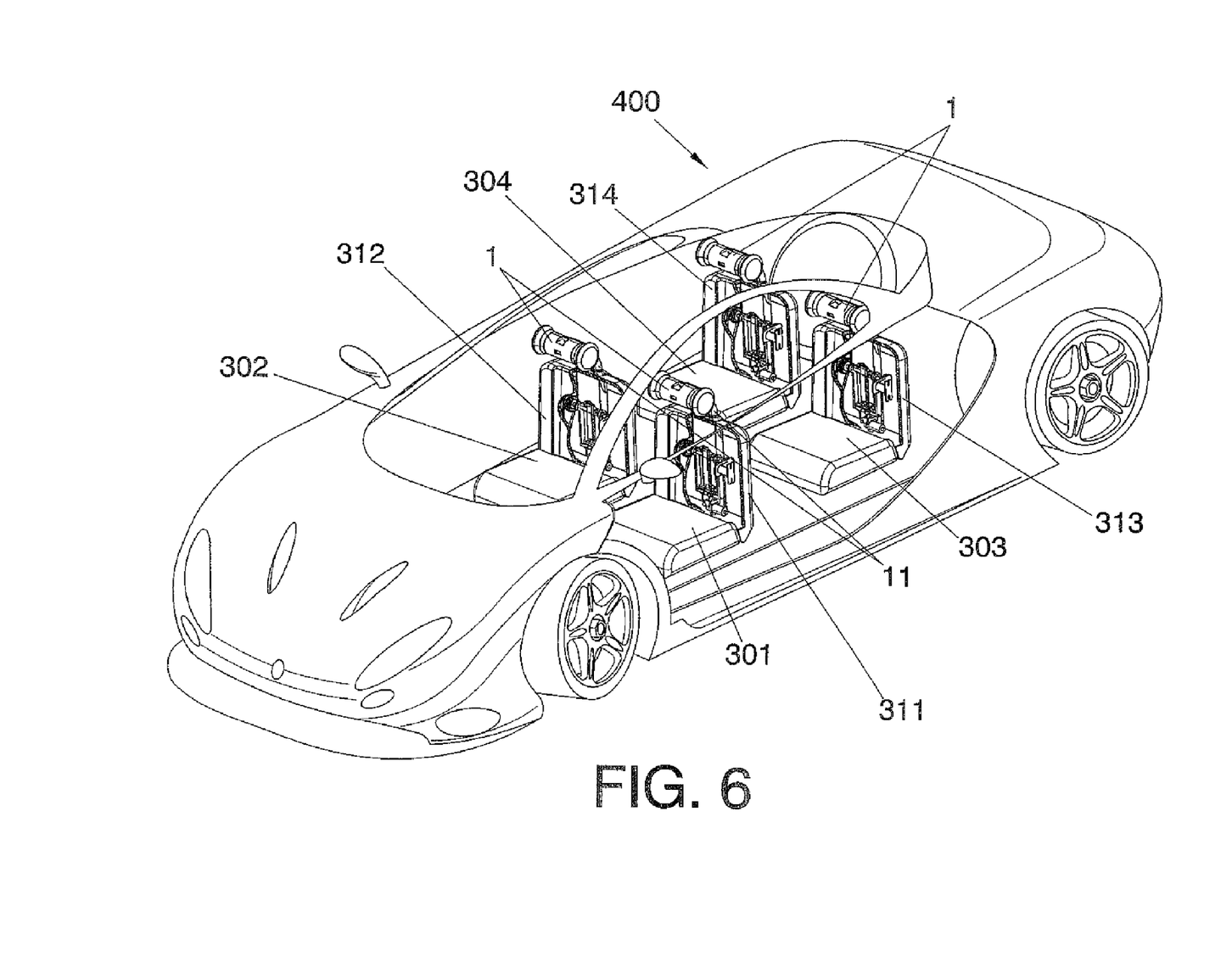
FIG. 6 is a perspective schematic view of a vehicle with seats provided with respective headrest systems according to an embodiment of the invention.

FIG. 6 shows an automotive vehicle 400 with its bodywork partially eliminated to allow seeing the seats, with each one comprising a seat part (301-304) and a back part (311-314). The back part (311-314) of each seat incorporates a headrest system according to the invention, with its headrest device 1, arm 11, etc. Logically, it is not necessary for all the seats to be provided with this type of system.

Figure 7:
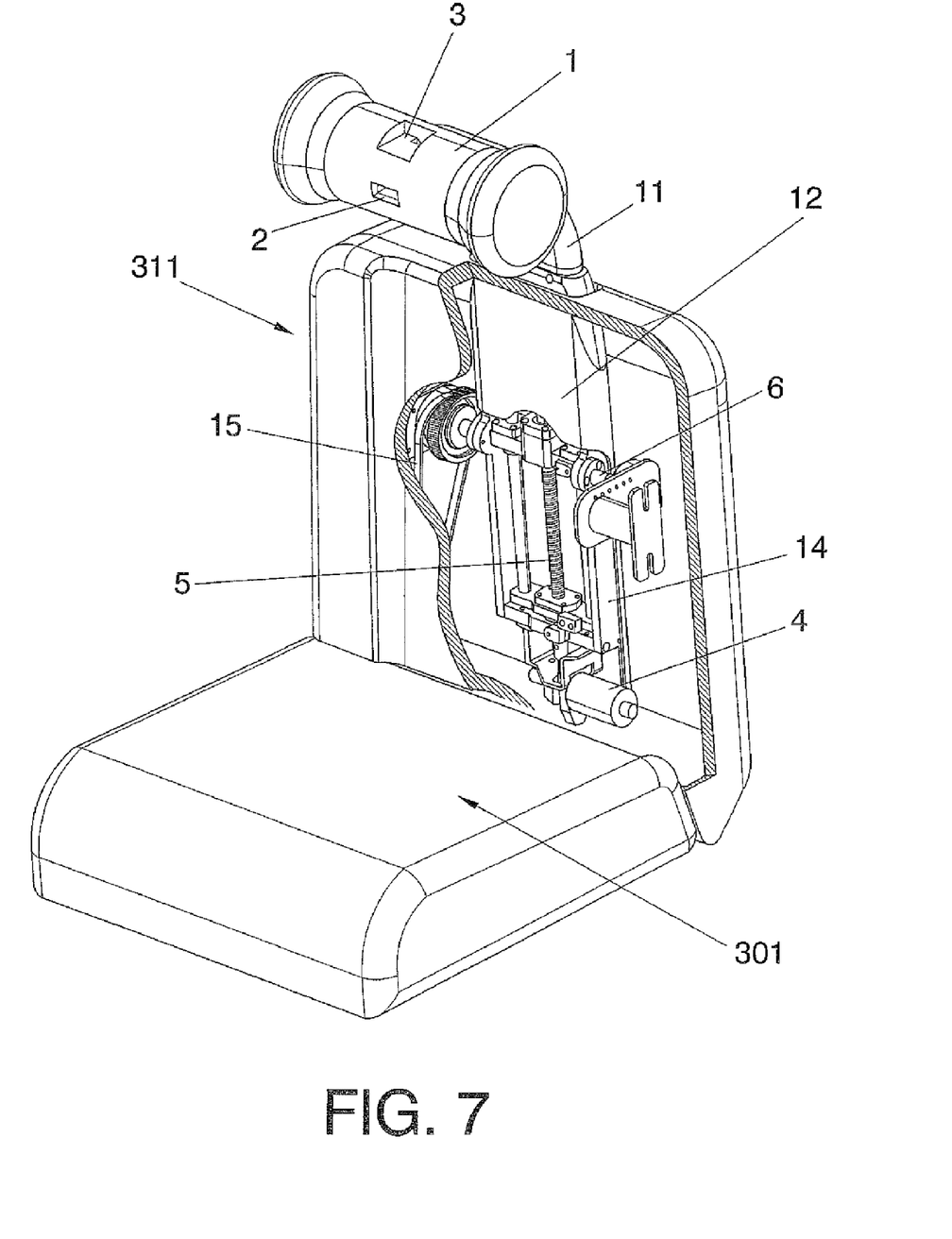
FIG. 7 is a more detailed perspective view of one of the seats shown in FIG. 6.

FIG. 7 shows how the headrest device 1 of one of the seats (301, 311) is assembled in the arm 11 which can move linearly within the casing 12, which is assembled in a framework or frame to which it is joined by means of a support structure 14, such that the casing 12 can pivot about a spindle or shaft 6 joined to said support structure 14. In this specific embodiment of the invention, the sensor 3 detecting the upper part of the head is located in the upper part of the headrest device 1, and the other sensor 2 measuring the distance to the rear part of the head during the "scanning" is located in the central part of the headrest device.

In addition, the belt 15 connecting a motor (not shown) with the shaft 6 to pivot the casing 12 (and, with it, the headrest device), as well as the motor 4 which, by means of the threaded rod 5, causes the upward or downward movement of the arm 11 and, with it, of the headrest device 1, can be seen.

In this text, the word "comprise" and its variants (such as "comprising", etc.) must not be interpreted exclusively, i.e., they do not exclude the possibility that what is described includes other elements, steps, etc.

On the other hand, the invention is not limited to the specific embodiments which have been described but also covers, for example, the variants which can be made a person having ordinary skill in the art (for example, as regards the choice of materials, dimensions, components, configuration, etc.), within what is inferred from the claims.

The invention claimed is:
1. Headrest system comprising:
a headrest device configured to serve as a support for the rear part of the head of a user;
a plurality of sensors located in the headrest device and configured to record data relating to said head; and
an electromechanical headrest device positioning system, associated to said sensors and configured to locate the headrest device in a certain position, in a vertical and horizontal direction, according to information coming from said sensors;
characterized in that
the headrest device positioning system is configured to, as a response to an activation signal, carry out the following operations:
starting a single upward movement of the headrest device until detecting, by means of at least one of said sensors, that the headrest device has reached a certain height with respect to an upper edge of the head;
stopping said upward movement of the headrest device when the system detects that the headrest device is located at said certain height;
recording, during said upward movement and by means of at least one of said sensors, data relating to the distance between the headrest device and the head in a plurality of positions of the headrest device throughout said upward movement;

once said upward movement has stopped, moving the headrest device substantially horizontally, according to said data, to locate the headrest device at a certain distance from the head.

2. Headrest system according to claim 1, characterized in that said plurality of sensors comprises at least one sensor configured to detect the upper edge of the head.

3. Headrest system according to claim 2, characterized in that said sensor configured to detect the upper edge of the head is located at an upper end of the headrest device.

4. Headrest system according to claim 2 or 3, characterized in that said sensor configured to detect the upper edge of the head is configured to generate a first output signal when it records a presence of an object in front of the sensor, and to generate a second output signal when it does not detect such presence of an object.

5. Headrest system according to any of claims 2-3, characterized in that said sensor configured to detect the upper edge of the head and said positioning system are configured to stop the upward movement when the upper edge of the headrest is substantially located at the height of the upper edge of the head.

6. Headrest system according to any of claims 2-3, characterized in that said sensor configured to detect the upper edge of the head is an infrared sensor.

7. Headrest system according to claim 1, characterized in that said plurality of sensors comprises at least one sensor configured to generate an output signal indicating a distance between the headrest device and a point of the head located in front of said sensor.

8. Headrest system according to claim 7, characterized in that said sensor configured to generate an output signal indicating a distance between the headrest device and a point of the head located in front of the sensor is an infrared sensor.

9. Headrest system according to claim 7 or 8, characterized in that said sensor configured to generate an output signal indicating a distance between the headrest device and a point of the head located in front of the sensor is located in a central area of the headrest.

10. Headrest system according to claim 1, characterized in that the upward movement is a linear movement along a first shaft.

11. Headrest system according to claim 10, characterized in that said linear movement along said first shaft is a movement generated by a first motor forming part of the positioning system.

12. Headrest system according to claim 11, characterized in that said first motor is arranged to interact with at least one threaded rod parallel to said first shaft such that a rotational movement of the motor causes said linear movement along said first shaft.

13. Headrest system according to any of claims 10-11, characterized in that the substantially horizontal movement is a movement according to a second shaft.

14. Headrest system according to claim 13, characterized in that the substantially horizontal movement is a rotational movement about said second shaft, said second shaft being perpendicular to said first shaft.

15. Headrest system according to claim 13, characterized in that said substantially horizontal movement is a linear movement.

16. Headrest system according to claim 15, characterized in that said substantially horizontal movement is a linear movement substantially perpendicular to said first shaft.

17. Headrest system according to claim 13, characterized in that the positioning system comprises a second motor configured to cause said substantially horizontal movement.

18. Headrest system according to claim 1, characterized in that it additionally comprises at least one contact sensor located in the headrest device and configured to detect the contact of the head of the user with the headrest device, the positioning system being configured to change the position of the headrest device when said at least one contact sensor detects a contact force greater than a predetermined threshold.

19. Headrest system according to claim 1, characterized by comprising an electronic subsystem configured to control the position of the headrest device by means of said upward movement and said substantially horizontal movement according to signals received from the sensors.

20. Headrest system according to claim 1, characterized in that the positioning system is configured to adjust the position of the headrest according to a readjustment frequency.

21. Vehicle seat comprising a seat part and a back part, characterized in that the back part incorporates a headrest system according to claim 1.

22. Automotive vehicle including at least one seat according to claim 21.

* * * * *